United States Patent [19]

Silitch

[11] 3,766,476

[45] Oct. 16, 1973

[54] HIGHWAY RADIO COMMUNICATION SYSTEM

[75] Inventor: Peter Silitch, Riverdale, Mo.

[73] Assignee: United Communications Industries, Inc., Washington, D.C.

[22] Filed: May 21, 1971

[21] Appl. No.: 145,851

[52] U.S. Cl. .......................... 325/26, 179/82, 325/51

[51] Int. Cl. .......................... H04b 7/04

[58] Field of Search .......................... 325/51, 117, 129, 325/180; 343/719; 179/82; 340/32, 33

[56] References Cited

UNITED STATES PATENTS

| | | | |
|---|---|---|---|
| 2,980,793 | 4/1961 | Daniel | 325/129 X |
| 3,470,474 | 9/1969 | Rohrer | 325/51 |

*Primary Examiner*—Benedict V. Safourek
*Attorney*—Brady, O'Boyle & Gates

[57] ABSTRACT

Apparatus for enhancing radio frequency signal communications between a vehicle moving along a path of travel and an AM radio transmitter where there is a requirement for restricted signal power radiation in the vicinity of the apparatus. This is accomplished by utilizing a relatively high impedance longitudinal transmission line laid along a path of travel beneath the vehicle which includes a radio receiver having one input signal terminal attached to the metal frame of the vehicle while the other terminal is connected to an electric whip antenna mounted on and generally toward one end of the vehicle. The radio transmitter is coupled to the longitudinal transmission line so as to propagate a communication signal therealong in a direction toward the end of the vehicle containing the antenna.

Due to the close proximity of the vehicle to the longitudinal high impedance transmission line, a signal voltage is capacitively induced from the transmission line to the vehicle frame and to the input signal terminal attached thereto due to the voltage on the conductor with respect to a ground plane while the current flowing in the transmission line and the shielding effect of the vehicle over the transmission line give rise to radial and tangential electric induction field components at the antenna which causes a resultant signal voltage component to be coupled to the other receiver input signal terminal which aids the signal voltage induced on the vehicle frame thereby increasing the input signal level to the receiver.

20 Claims, 17 Drawing Figures

INVENTOR
PETER SILITCH
BY Brady, O'Boyle & Gates
ATTORNEYS

HIGHWAY RADIO COMMUNICATION SYSTEM

BACKGROUND OF THE INVENTION

1. Field of the Invention

This invention relates generally to short range radio communication systems operating in the standard AM broadcast band and more particularly to a radio communication system providing a high quality communication link between a longitudinally and horizontally disposed radio signal conductor and a radio receiver in a vehicle having a vertical electric whip antenna while complying with regulations governing short range communications devices meeting the requirements concerning unlicensed radiation spelled out in the rules and regulations of the Federal Communications Commission (FCC) Part 15*e*, or similar such rules in force or to be in force.

2. Description of the Prior Art

The prior art contains radio communications systems for highways which contemplate burying the radio communications transmission line which functions as a horizontally polarzied electromagnetic radiating antenna, which because of its low impedance has associated with it a strong magnetic induction field but a weak electric induction field in its vicinity, placed in the median strip or shoulder of a divided highway or in the center of the highway itself for transmitting messages to vehicles moving along the highway to alert the driver as to various road conditions, weather, traffic and the like which the vehicle will encounter. Other systems utilize cables, or telephone and power transmission lines running along one edge of the highway, while still other systems use various other types of antenna means such as simple loop antennas selectively positioned along the highway route for communicating with the passing vehicles.

All of these short range communications systems suffer from an inherent limitation insofar as actual use is concerned due to the fact that such systems depend on magnetic induction coupling as opposed to electric induction coupling between the transmitter and the receiver. As a result thereof these systems transmit either too little power to provide acceptable listenable service on a standard automotive receiver with an electric whip antenna, or transmit more power than meets the requirements of Part 15*e* of the Commissioner's Rule, which concerns unlicensed radiation. The sensitivity of the poorest quality auto radio receivers and the normal varying ambient noise levels along the route determines the minimum signal level which will provide acceptable listener service; however, the regulations of Part 15*e* place stringent limitations on the amount of permissible electromagnetic radiation at given distances. The maximum amount of electromagnetic radiated energy is expressed by a formula in which the referenced distance is 100 feet and more particularly is expressed as 24,000 microvolts per meter/frequency (expressed in kilohertz) at 100 feet away from the transmitting source. For example where the frequency of operation is 1000KHz, the rules dictate that the measured radiation 100 feet away from the source cannot exceed 24 microvolts per meter.

It is obviously desirable to provide signal strength in excess of the minimum acceptable level to assure high quality noise free reception. It has been observed, however, that prior art systems which while apparently meeting the radiated field strength requirements of the above mentioned FCC rules, and apparently providing strong signals in the vicinity of the vehicle, still nevertheless fail to provide acceptable listening signal levels on a standard AM automotive receiver coupled to an electric whip antenna. This is due to the fact that the method of measurement exclusively used by communications authorities to measure field strengths relies on utilizing magnetic loop receiver apparatus. The conventional automotive radio, on the other hand, is a receiver coupled to an electric probe or whip antenna rather than a magnetic loop antenna. Therefore, a magnetic field strength measurement is not sufficiently indicative of the performance of a standard vehicle receiver at distances where induction fields dominate. Further, it has been observed that the geometric orientation of the test loop utilized in making electromagnetic field strength measurements must be taken into account when making such measurements as quite different field patterns result at different orientations of the axis of the loop or at different polarization angles.

It is well known that signal currents in a long longitudinally disposed conductor induce magnetic fields in the vicinity of the conductor whose strength varies primarily as a function of $1/r^2$ where r is the distance from the conductor. This relationship holds for distances ($r$) for up to about 0.1 wavelength of the transmitting frequency. With signal currents in such a conductor adjusted so as to produce at the 100 foot distance, at a carrier frequency of for example 1.0MHz, a measured magnetic field strength of 22.8 microvolts per meter which complies with the FCC requirement, a loop magnetic receiver such as a standard field strength meter or even a portable transistorized radio when properly oriented can receive a high quality signal from the magnetic induction field in the vicinity of said conductor up to more than 0.02 wavelength which means that at about 20 feet from the conductor a signal strength of 570 microvolts per meter would be received. But due to the fact that the whip or windshield antennas universally used in vehicular broadcast band radios are responsive substantially only to electric fields having vertical polarization as opposed to any magnetic fields and that a continuous unobstructed longitudinally disposed conductor generates a horizontally polarized electric field with no resultant vertically polarized component, such a receiver will not perform satisfactorily at such distances mentioned above when Rule 15*e* is complied with as above. It can be seen therefore that a prior art system may comply with Part 15*e* of the FCC regulations while yet not providing a signal level sufficient to provide a minimum quality signal. This is due to the fact that a representative vehicular radio of the type commonly used in the standard AM band requires vertically polarized electric field strengths in the order of 250 microvolts per meter to 1000 microvolts per meter to receive a minimum quality signal.

SUMMARY

The present invention is directed to apparatus for enhancing the signal level of radio frequency reception in an automotive vehicle moving along a path of travel from an AM radio transmitter where there is a requirement for highly restricted power transmission in proximity to said path of travel by improving the electric field coupling of a communications signal to the vehicle as compared to the prior art. The invention comprises, inter alia, a longitudinal transmission line having a relatively high impedance for increasing the electric induction field to a relatively high level in relation to the magnetic induction field, which transmission line is distributed along a predetermined path of travel for a vehicle and being positioned with respect to the vehicle frame, such as beneath the frame, to electrically induce or capacitively couple a voltage thereto resulting from the vertical electric field gradient present between the potential on the transmission line and a ground plane lying beneath the transmission line. This potential results from the product of the current flowing in the transmission line and the characteristic impedance of the line. A standard AM radio receiver located on the vehicle includes a pair of input signal terminals, one of which is coupled to the metal frame of the vehicle whereupon the voltage induced in the vehicle frame is applied to said terminal. An electric whip radio antenna is mounted on the vehicle in a generally vertical orientation on a portion of the vehicle, such as the forward portion thereof, and is coupled to the other input signal terminal of the radio receiver. The invention further comprises an AM transmitter coupled to the transmission line to propagate a communications signal along said transmission line in a direction toward that portion of the vehicle containing the antenna whereby the close proximity of said vehicle with respect to said longitudinal transmission line shields a portion of the transmission line from the antenna whereupon vertically polarized electric fields components result at said electrostatic antenna, the net effect of which is to produce a voltage at the other input signal terminal of the radio to reinforce the signal voltage applied to the first input terminal due to the signal voltage induced on the vehicle frame. This effectively utilizes the standard AM vehicular receiving antenna system in a reverse way from that utilized by signals originating from distant vertically polarized transmitters as well as in the normal way and as a result thereof the operation of the radio is enhanced due to the increased signal level present across the pair of input signal terminals.

DESCRIPTION OF THE PREFERRED EMBODIMENTS

Figures 1A, 1B, 2, 4, 5:
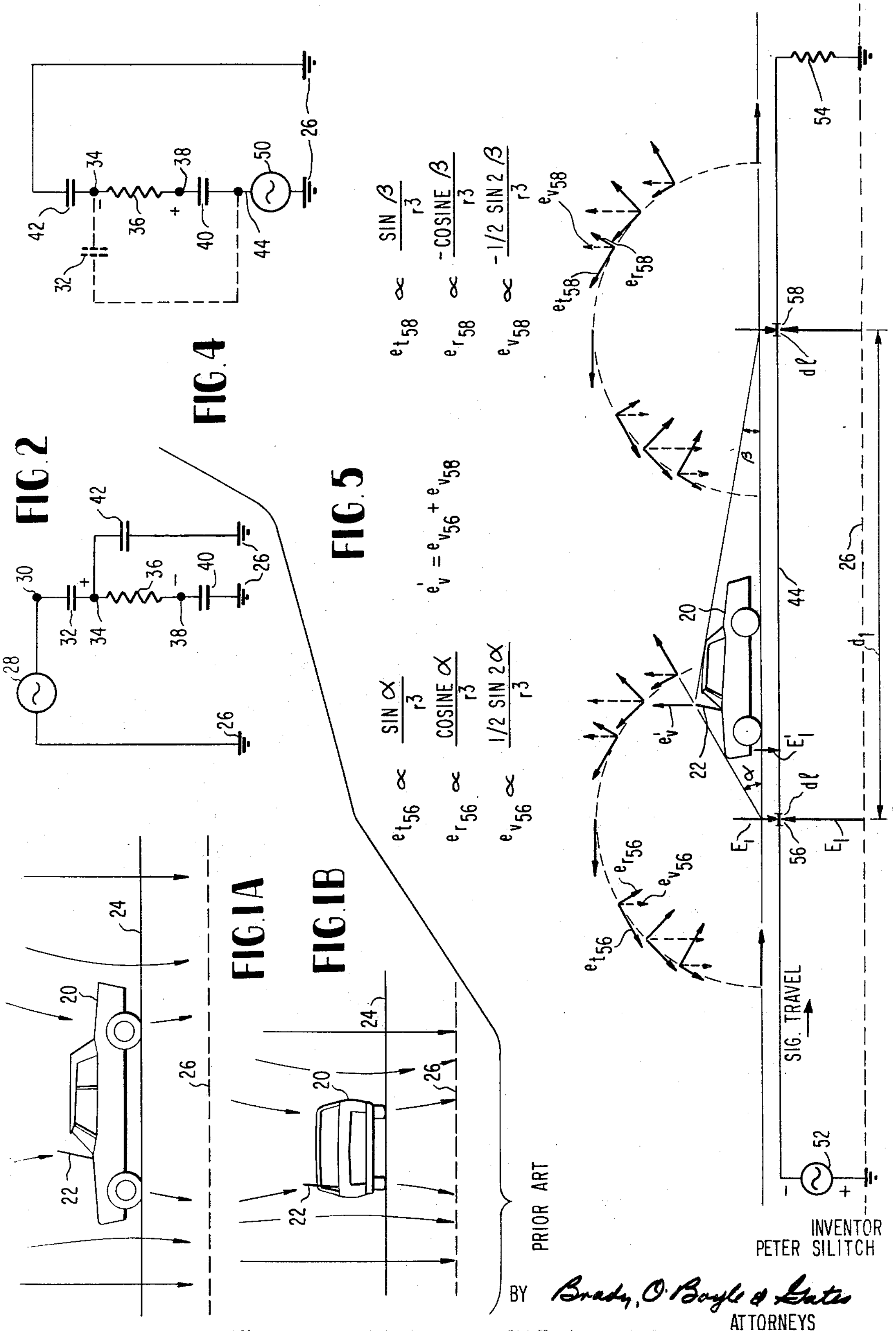
FIGS. 1A and 1B are diagrammatic profile and front elevational views respectively of a typical AM automotive radio receiving system.
FIG. 2 is an electrical equivalent circuit diagram of an auto radio receiving system in the presence of a vertically polarized radiated field from a distant AM transmitting antenna.
FIG. 4 is an electrical equivalent circuit diagram of an automotive radio receiver operating in accordance with the subject invention.
FIG. 5 is a diagrammatic side elevation view partially in section illustrating the principle of operation of the subject invention.

As additional background information, it can be shown that the phenomena associated with a current flowing in a straight horizontal wire can be resolved into three fields. The first of these fields is the well known electromagnetic radiation field whose electric or magnetic components vary inversely proportional to the distance away from the wire and whose relative intensities are fixed by the electromagnetic constants of the medium through which they travel (376.7 ohms in free space). It can be shown that the radiation field is relatively very small and is negligible at a distance less than 0.1 wavelength of the carrier frequency. The second field is known as the magnetic induction field which varies inversely as the square of the distance from the wire and is the dominating magnetic field up to 0.1 wavelength away from the wire. The third field comprises an electric induction field which varies inversely as the square of the distance away from the wire and if the wire is short compared to this distance, there is a dipole electric field component which varies inversely as the third power of the distance from the wire. The electric field can be resolved into a radial electric field component and a tangential electric field component. This is further disclosed in the handbook entitled *Reference Data for Radio Engineers*, Fourth Edition, by The Federal Telephone and Radio Corporation, at pages 662 and 663. The electric induction field substantially vanishes in a continuous lossless horizontal wire at a distance greater than 0.1 wavelength which in the case for a 1MHz carrier signal would be approximately 100 feet away from the wire.

Bearing the foregoing in mind and directing attention to systems for communicating with vehicles traveling on a roadway, a short vertical radiator in relationship to the transmission distance located on the side of the road in combination with a sensitive whip receiving antenna on the vehicle, useful signals can be transmitted about 46 feet while complying with Part 15 of the FCC rules for operation at 1MHz. With such a short vertical radiator, the electrostatic field predominates up to a distance of about 0.06 wavelengths, that is about 60 feet; however, short vertical radiators placed 100 feet apart and within 46 feet of the farthest traffic to be reached alongside the road are impractical for safety and economic reasons. With the horizontally disposed current carrying conductor system such as disclosed in U.S. Pat. No. 3,470,474 issued to R. E. Rohrer operating at a carrier frequency of 1MHz and within the FCC requirements (24 microvolts per meter magnetic field strength at 100 feet) a 4.8 millivolts per meter horizontally polarized signal will be found about seven feet away from the conductor for the best receiving case and the more usually necessary 50 millivolts per meter horizontally polarized signal for vehicular radios is induced at distances of less than 2.25 feet. Thus useful communications are possible only at distances less than a half a traffic lane width between the longitudinally disposed conductor and the vehicular antenna which as has been noted above, comprises an antenna responsive primarily to vertically polarized signals. In short, the prior art magnetically couples energy to an electrostatic device and in the case for a horizontally disposed current carrying conductor attempts to couple horizontally polarized signals to a vertically polarized electric whip antenna which inherently discriminates against them. This is the reason why prior art systsms while operable fail to provide a high quality signal to a vehicular radio while operating within the requirements of the FCC regulations irrespective of whether the horizontal conductor is in the air, under ground, or on the surface. The last two conditions make the situation even worse because of the "lossy" ground medium intervening in the transmission path and becuase of surface exponential or trapped wave propagation decay phenomenon.

Referring now to the drawings wherein like parts are indicated by like reference numerals throughout, attention is first directed to FIGS. 1A and 1B together. Reference numeral 20 is directed to a vehicle such as an automobile which includes a standard AM broadcast band (540–1600KHz) radio receiver, not shown, which is coupled to an electric whip receiving antenna 22 mounted on the forward portion of the vehicle. The vehicle is traveling over the surface of a roadway 24. In standard AM broadcast systems, a remote transmitting antenna such as a tower, not shown, radiates vertically polarized signal energy which can be described by vertical radiant vectors that terminate in a ground plane 26 below the surface 24. The effective ground plane 26 is below the surface 24 due to the fact that earth exhibits such a characteristic. The AM broadcasting system radiates vertically polarized energy so that the receiving antenna 22 can be made to discriminate against horizontally polarized signals in order to overcome noise provided by power lines and telephone line whose currents are substantially horizontally oriented and thereby radiate horizontally polarized energy. FIGS. 1A and 1B additionally disclose vertically polarized potential gradient lines E which return to earth in the vicinity of the vehicle 20. In doing so the electric field in the vicinity of the vehicle 20 bends inwardly to the vehicle and then outwardly therefrom in its path towards the ground plane 26. The vertical whip antenna 22 is an electrical stub probe or electric coupling device responsive to vertically polarized energy which has an electrical length substantially equal to 0.6 of its geometric length. Thus for example the standard auto radio antenna 22 is made to have an electrical length in the order of one meter for operation over the standard broadcast band. The vehicle 20 acts as a counterpoise for the antenna 22 which leads into consideration of FIG. 2.

FIG. 2 discloses an electrical equivalent circuit for a radio receiver in a vehicle located in the presence of a vertically polarized radiated field from a distant transmitting antenna with the receiver tuned to resonance. The signal generator 28 represents the radio electric field gradient and the equivalent of the vertically polarized field energy (+V) appears at terminal 30 which is one side of a capacitor 32 which is representative of the antenna 22 shown in FIGS. 1A and 1B. A very short whip antenna accordingly can be considered as a capacitor 32 which is coupled to the vertically polarized field gradient lines. The other side of the capacitor 32 is coupled to terminal 34 which is common to an impedance 36 which constitutes the impedance of the input circuit of the radio receiver. The other side of the impedance 36 is coupled to a terminal 38 which can be considered common to the frame of the vehicle 22 which is comprised of current conductive material. The vehicle itself can be considered a capacitor 40 coupled between the ground plane 26 and the frame (terminal 38) and additional capacitor 42 comprises a distributed capacitance occurring between the receiver input terminal 34 and the ground plane 26 which reduces the effective length of the antenna. It is the presence of the capacitor 42 which reduces the electrical length of a whip antenna to approximately 0.6 of its geometric length. While an external whip antenna is disclosed in FIGS. 1A and 1B, it should also be pointed out that when desirable, a windshield type of antenna may be utilized with the only requirement being that it be mounted in a generally vertical orientation. The RF input signal coupled to the radio receiver constitutes the voltage appearing between terminals 34 and 38 shown in FIG. 2, which is the voltage difference between the vehicle frame and the antenna.

It has been pointed out that the problem existing with prior art apparatus is that such apparatus establishes at near distances a magnetic link between a relatively "lossy" generally horizontally disposed transmission line and a radio receiver coupled to a vertically polarized electric whip antenna which does not respond to this magnetic induction field. The present invention has for its object the enhancement of the electric communications link between a relatively high impedance longitudinally disposed transmission line which has the effect of inhibiting the magnetic induction field while enhancing the electric induction field and a radio receiver in a vehicle coupled to a vertically polarized electric whip antenna. To this end the invention is concerned with capacitively coupling a signal voltage from the longitudinal transmission line to the vehicle frame due to the voltage on the line and inducing an electrical voltage on the antenna due to its position and the shielding effect of the vehicle with respect to the transmission line which induced voltage on the antenna is out of phase with that induced on the vehicle frame to effectively increase the signal level appearing across the input circuit of the receiver.

Figures 3, 8, 9:
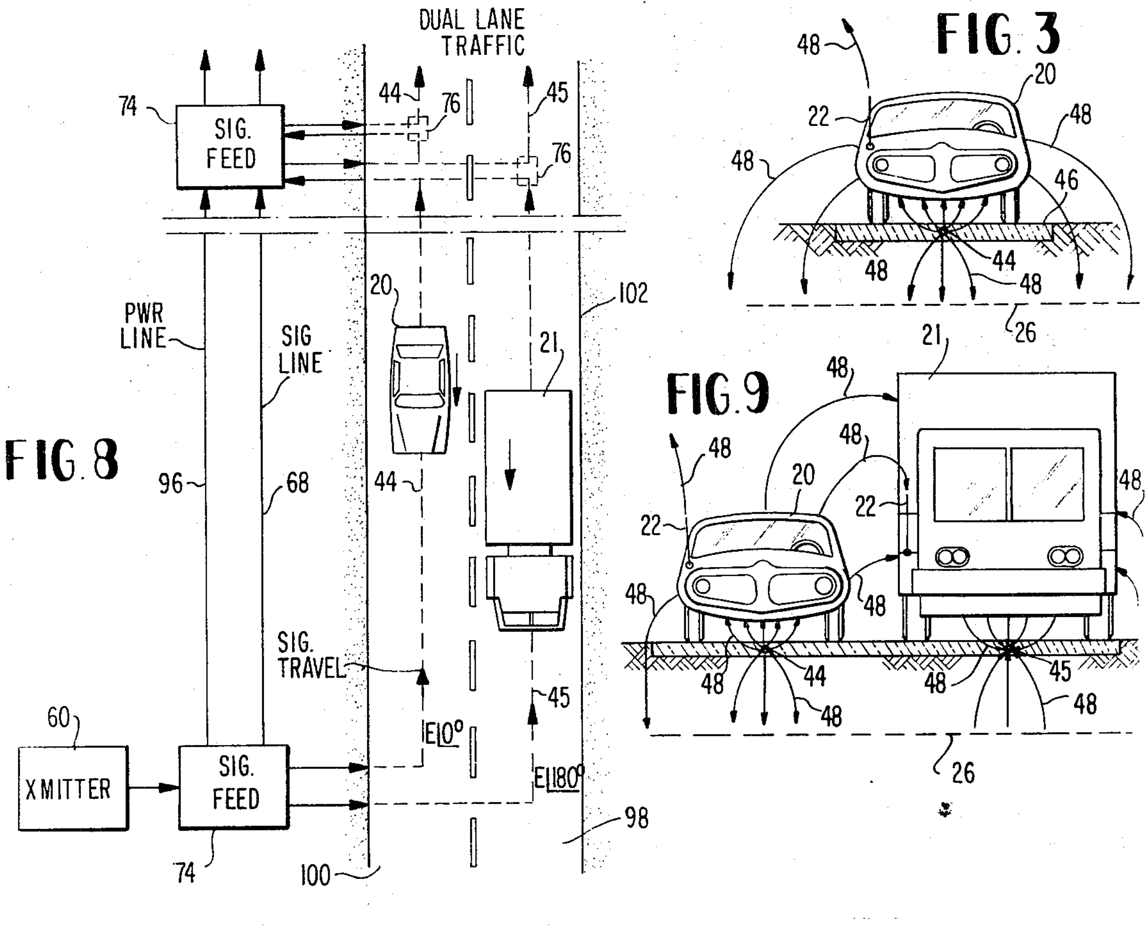
FIG. 3 is a front plan view partially in section illustrative of the principle of operation of the subject invention.
FIG. 8 is a top plan view of a roadway including two traffic lanes for unidirectional traffic flow employing a secnd embodiment of the subject invention.
FIG. 9 is a front plan view partially in section of a portion of the dual lane traffic configuration shown in FIG. 8.

Referring now to FIG. 3, the present invention contemplates locating a relatively high impedance horizontally disposed signal transmission line 44, which may be comprised of for example 24 to 34 gauge wire, located for practical reasons beneath the outer surface of a roadway in the middle of the traffic lane so that it lies beneath the vehicle 20 or closely proximate thereto so as to be substantially beneath the vehicle 20. The impedance of the transmission line 44 is made as high as possible bearing in mind the practical limitations imposed by mechanical and electrical consideration which has the effect of increasing the electic induction field while reducing the magnetic induction field. A radio signal source, not shown, is coupled to the transmission line 44, whereupon a voltage will appear between the transmission line 44 and the ground plane 26. Inasmuch as the impedance of the transmission line 44 is relatively high the electric induction field will be enhanced while the magnetic induction field will be effectively reduced. FIG. 3 additionally discloses electric induction field gradient lines 48 extending from the conductor 44 to the ground plane; however, due to the presence of the vehicle in close proximity over the conductor, additional electric lines of force or potential gradient are coupled to the vehicle where they then pass therefrom to the ground plane 26. Thus a voltage is induced on the metal frame of the vehicle 20.

An electrical equivalent circuit of the configuration shown in FIG. 3 is illustrated in FIG. 4 when used in conjunction with the transmission line 44 and is substantially different from the auto radio receiving system receiving energy from a distant transmitting antenna due to the fact that now a voltage generator 50 appears between the ground plane 26 and one side (transmission line 44) of the capacitor 40 and the capacitor 32 which reflect respectively the vehicle 20 capacity to the conductor 44 and the equivalent capacitance of the antenna coupling to the electric induction field from the current flowing in the conductor which field will be discussed below. The antenna shunt capacity to the ground plane 42 in the equivalent circuit shown in FIG. 4, again appears between the internal terminal 34 and the ground plane 26. It should be observd, however, that any potential due to the antenna capacity 32 to the conductor 44 now appears across the receiver input impedance 36 between the receiver input terminals 34 and 38 and is in opposition to the voltage across capacitor 40 which has one side thereof connected to terminal 38. Therefore the effective voltage across the impedance 36 is the difference in voltage appearing across capacitors 40 and 32. One would expect, therefore, that this phenomenon would be an inherent characteristic which would be deleterious to the operation of the system, but upon investigating the nature of the field in the vicinity of the antenna due to the partially shielded current flow in line 44 it will be seen that this characteristic can be made to aid or hinder the operation of the system and herein lies the discovery related to the subject invention.

It has been discovered that the voltage appearing across the effective antenna capacitance can be made to add to the effective voltage appearing across the capacitance 40 and effectively increase the signal level of the voltage appearing across terminals 34 and 38. Referring now to FIG. 5, there is disclosed a diagrammatic illustration of the inventive concept taught by the subject invention. As noted above, a horizontally disposed relatively high impedance transmission line 44 is extended along a length of roadway so that it lies substantially beneath the vehicle 20 such as shown in FIG. 3 so that electrical field gradient lines are coupled to the vehicle. In the embodiment shown in FIG. 3, the transmission line 44 lies between the wheels. The transmission line may lie outside of the wheels a short distance; however, there comes a point where induction coupling would cease to take place and the body of the vehicle ceases to shield the antenna 22 from portions of the conductor 44. It can be seen that the best case for electrostatic coupling would be where the transmission line 44 lies directly beneath the center of the auto, such as shown in FIG. 3 or under one or two of its wheels. The subject invention couples a radio signal source 52 to the high impedance transmission line 44 at one end thereof while the opposite end is properly terminated to the ground plane 26 to avoid any backward or reflected wave transmission. The end to which the radio signal generator 52 is connected is not one of choice but is specifically required to be at the end facing that part of the vehicle upon which the receiving antenna 22 is mounted. This means that for a front mounted antenna, a radio signal is propagated along the transmission line 44 in a direction opposite to the forward movement of the vehicle longitudinally over the transmission line. The conventional mounting of a whip antenna for auto radios is usually on one of the front fenders and occasionally along one of the supports of the front windshield. This is the situation disclosed in FIG. 5. However where the antenna 22 is mounted on the rear portion of the vehicle 20 shown in FIG. 5, the placement of the signal source 52 and the termination 54 would be reversed. If then that portion of the vehicle upon which the antenna is mounted substantially faces the source of propagation while the vehicle is moving in a forward direction, it has been observed that the signal received across the receiver input terminals, i.e. terminals 34 and 38 shown in FIG. 4 is appreciably increased over that received when the elements are reversed, which enhances signal reception to the vehicle when the transmitted intensity is limited so as to comply, for example, with Part 15*e* of the FCC regulations as well as rendering discriminatory improvement in overcomming interferring signals which are on the same channel as is always the case during nighttime operation on the standard broadcast band.

The reason for the receiver input signal enhancement is further disclosed in FIG. 5. Assuming that the instantaneous polarity of the signal coupled to the transmission line 44 from the signal source 52 is as shown in FIG. 5, the radiation field and magnetic induction field can be disregarded inasmuch as the distance between the vehicle and the transmission line 44 is less than 0.06 wavelength and the electric whip antenna 22 does not respond to magnetic effects, an electric voltage will appear between the transmission line 44 and the ground plane 26 which will cause a transverse field that can be expressed vectorially as shown in FIG. 5 by the reference characters $E_1$ and $E_1'$. The magnitude of the voltage vector gradient $E_1$ is proportional to the impedance Z of the transmission line 44 and the current I traveling therethrough. Since the magnitude of the impedance is made substantially high, the current flow will be reduced and in doing so increases the electric induction field while reducing the magnetic induction field according to well known physical principles relating to electromagnetic theroy. The electric field shown in FIG. 3 induces a voltage $E_1'$ on the current conducting frame of the vehicle 20 in the same vectorial direction as the electric field gradient (a negative voltage to ground in the example of FIG. 5). This voltage would be the voltage appearing at terminal 38 shown in FIG. 4. Due to the current traveling along the transmission line 44 an electric induction field is produced in its vicinity and when only those portions not shielded from the antenna 22 by the vehicle 20 are considered, a dipole field results which as noted above varies inversely as the third power of the distance from the conductor elements.

Referring now to FIG. 5, assume a point 56 along the transmission line 44 in front of the vehicle 20 and a point 58 behind the vehicle; electric dipoles of very small length d1 exist, each producing a radial electric field component $e_r$ and a tangential field component $e_t$. In a continuously long wire as stated above, the radial and tangential field components combine to render the resultant perpendicular or vertical effect negligible and result only in a horizontal vector (horizontally polarized electric field). However, choosing the points 56 and 58 as shown in FIG. 5, the vehicle 20 shields the antenna 22 from the transmission line 44 over the distance $d_1$. The angle between the transmission line 44 and the radial from point 56 to the top of the antenna 22 defines an angle $\alpha$ while the angle between the transmission line 44 and the radial from point 58 defines an angle $\beta$. It can be seen that $\alpha$ is greater than $\beta$ and in most vehicles $\beta$ approaches zero degrees due to the vehicular geometry. Turning attention to the vertical components of the electric fields in the vicinity of the antenna 22 due to the current flowing in the two elements 56 and 58, it can be seen that the vertical components from each element are opposite and if they were of equal intensity they would cancel. But since the strength (length) of these components is proportional both to $1/r^3$ (the inverse third power of the distance from antenna 22 to each element 56 or 58) and one half the sine of twice the angle $\alpha$ or $\beta$, respectively, the vertical electric component from element 58 is far smaller than that from element 56 since $\beta$ is smaller than $\alpha$ and since the distance from element 56 to the antenna 22 is less than that from element 58. Thus the vertical electric field from element 56 dominates at the antenna 22 and induces a voltage $e_v'$ on the antenna 22 which is in phase opposition to the voltage $E_1'$ induced on the frame. However in noting the equivalent circuit shown in FIG. 4, the vertical electric field component $e_v'$ would appear at terminal 34 which is of a proper polarity to increase the voltage appearing across terminals 38 and 34 thereby improving the communications link between the signal source 52 and the radio receiver, not shown, in the vehicle 20.

Conversely, if the transmitter 52 is at the opposite end of line 44 the signal will travel in the opposite direction in the line and if the same instantaneous polarity is chosen as is shown in FIG. 5, the vertical components $e_v$ affecting the antenna 22 will have reversed sign from that shown in FIG. 5 while the field $E_1'$ coupled to the vehicle 20 frame will remain the same, thus causing the voltage induced on the antenna 22 to subtract from the voltage appearing across the receiver terminals 34 and 38 since it will be in phase with the voltage appearing on the conductive frame of the vehicle 20 and will act to deteriorate the communication link.

Figure 6:
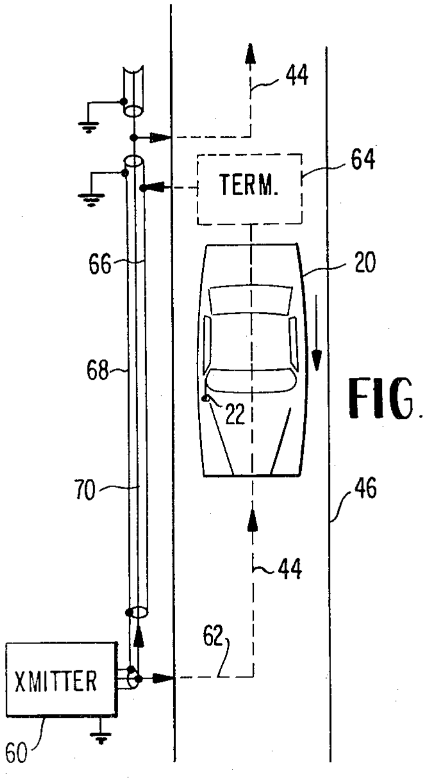
FIG. 6 is a top plan view of a vehicle traffic lane incorporating a first embodiment of the subject invention.

Therefore, the simplest embodiment of the subject invention is shown in FIG. 6 wherein a single lane roadway 46 includes a predetermined length of buried transmission line 44 in the center of the roadway being fed from a transmitter 60 by transmission means 62. The length of the transmission line 44 running down the middle of the roadway 46 is of a predetermined length, for example 1/10 to 1/8 of a mile where it couples into a transmission line termination 64 which couples back to the outer conductor 66 of a coaxial transmission line 68 whose inner conductor 70 is coupled to the succeeding segment of the horizontally disposed transmission line 44. The transmitter 60 is located forwardly of the vehicle 20 which includes a vertical whip antenna 22 mounted on the right front fender thereof. A radio communication signal is propagated along the 1/10 to 1/8 mile segment of transmission line 44 in opposition to the vehicle's movement where it is coupled to a signal return path comprising the outer conductor 66 of the coaxial transmission line 68. As noted above, if the majority of present day vehicles mounted the electric whip antenna 22 on the rear of the vehicle 20, the transmitter 60 would be located rearwardly of the vehicle traveling in the direction shown. In both instances received signal enhancement would occur for reasons which have already been discussed.

Figure 7:
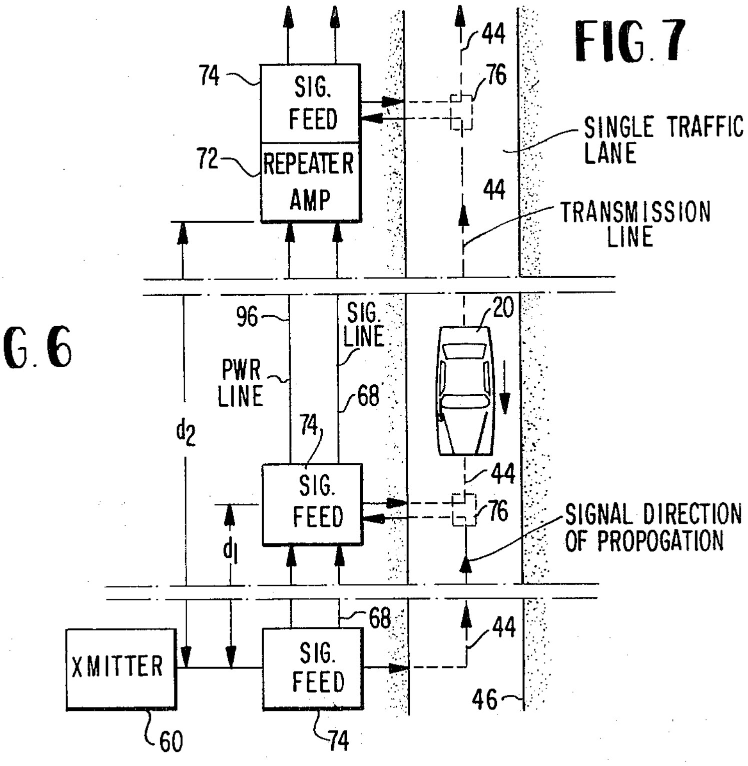
FIG. 7 is a top plan view of a single traffic lane including a second embodiment of the subject invention.

Referring now to FIG. 7 there is disclosed an embodiment similar to that as shown with respect to FIG. 6; however, what is intended to be illustrated in FIG. 7 is the requirement for repeater amplifier means at selected intervals in addition to intermediate feed points of signal coupling to transmission line segments 1/10 to 1/8 miles in length which corresponds to the dimension $d_1$. At a distance $d_2$ from the transmitter 60 and every corresponding distances thereafter a repeater amplifier 72 is included. This distance $d_2$ can be anywhere between the distance $d_1$ and up to two miles in length, for example. Also in order to facilitate the coupling of a communications signal from the transmitter 60 to each of the transmission line segments 44, a signal feeder circuit 74 appears at the begining of each new segment, being separated from its adjacent feeder circuit by a distance $d_1$. The first signal feeder circuit 74 is connected to the transmitter 60 and directly couples to the first transmission line segment 44 but additionally couples the signal from the transmitter 60 to the following signal feeder circuit over a coaxial transmission line 68 so that the second signal feeder circuit couples the communication signal to the second transmission line segment 44. At the end of each transmission line segment is a coupling and terminating device 76 an illustrative detailed example of which is shown in FIG. 14.

Figure 14:
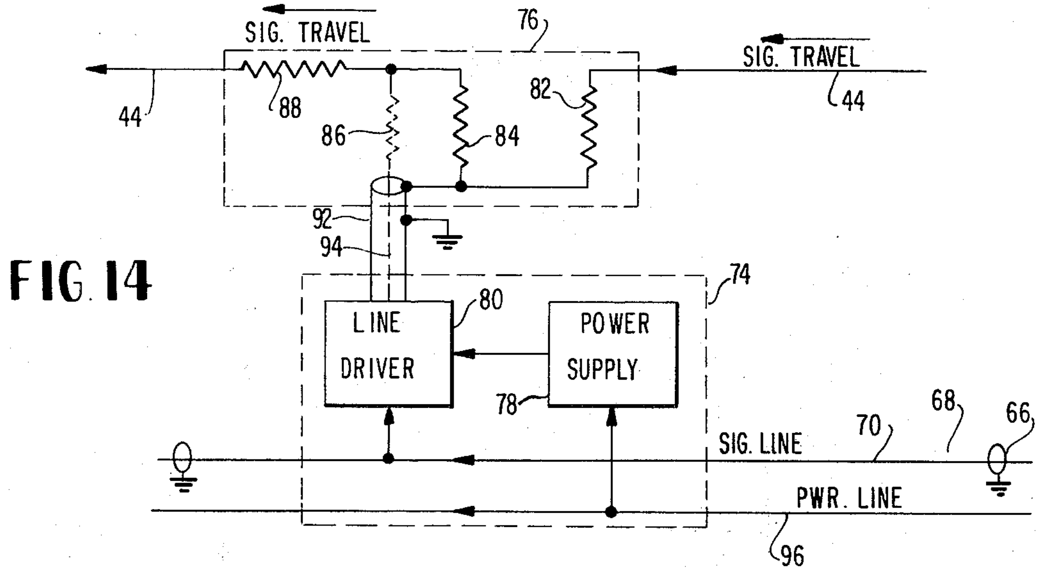
FIG. 14 is an electrical schematic diagram of a signal coupling and terminating circuit utilized in combination with the subject invention.
Figure 15:
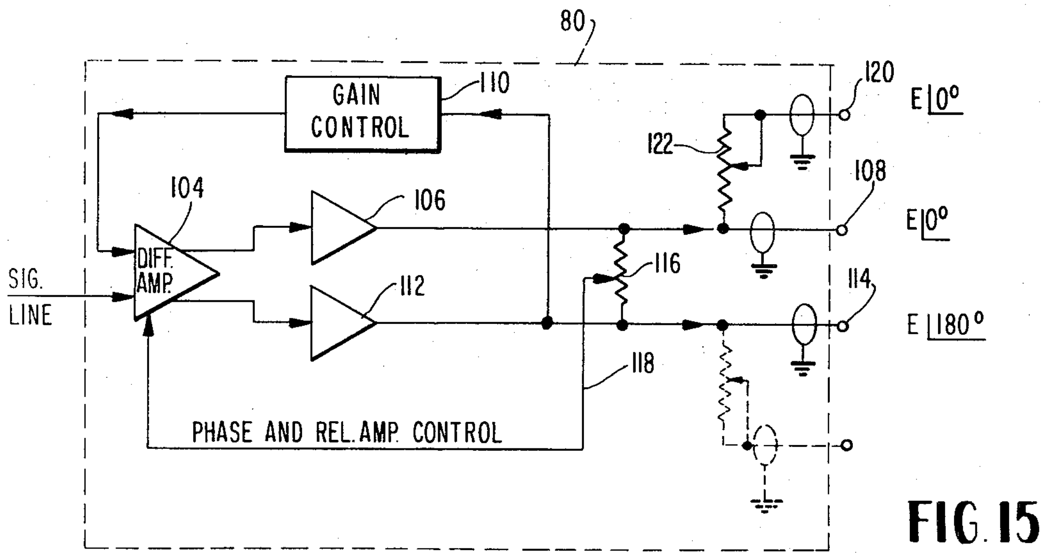
FIG. 15 is a block diagram illustrative of a signal feed unit or line driver utilized in combination with the subject invention.
Figure 16:
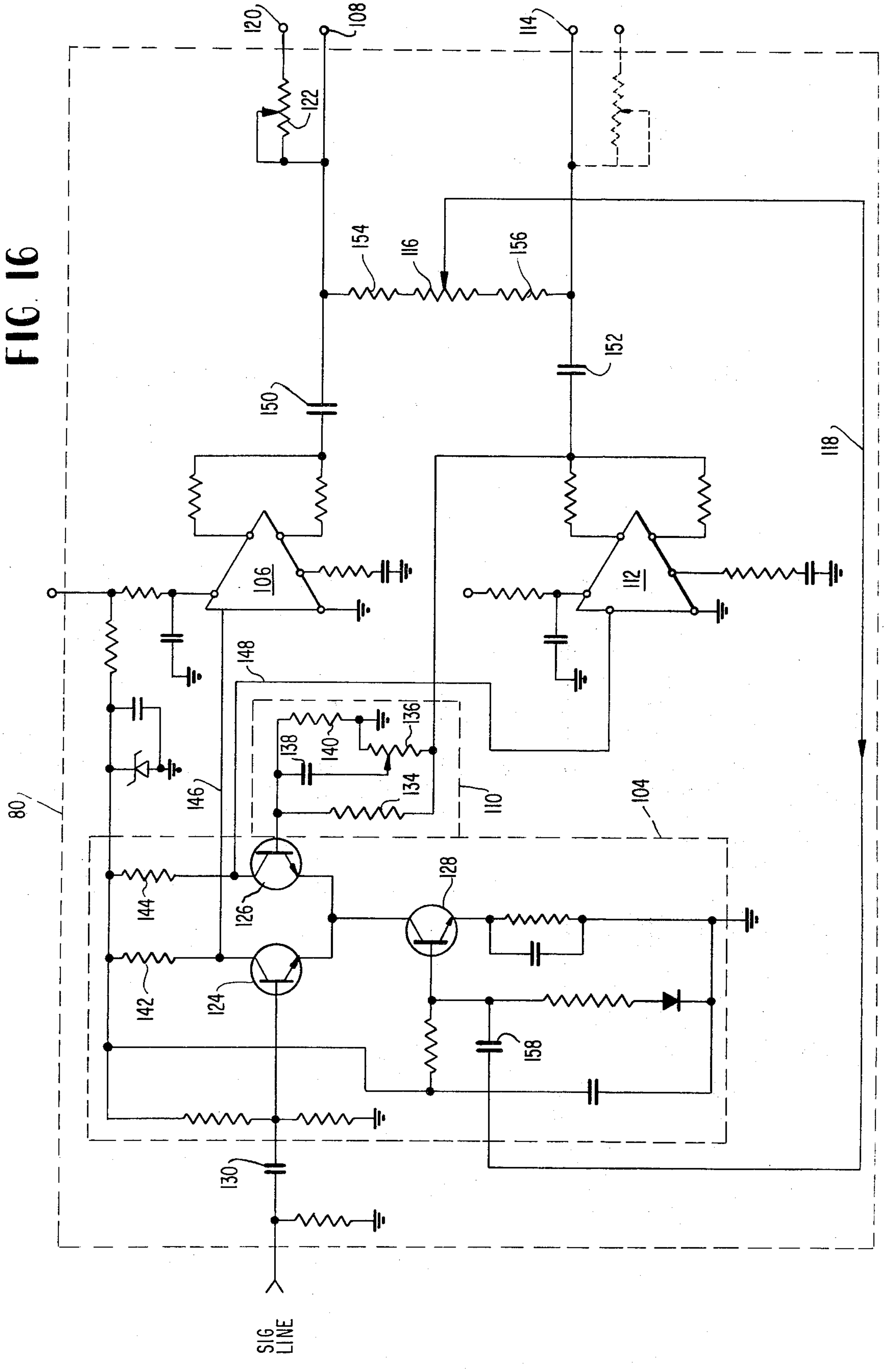
FIG. 16 is an electrical schematic diagram of the signal feed unit shown in FIG. 15.

Referring now briefly to FIG. 14, the signal feeder circuit 74 is shown comprised of an electrical power supply 78 and a line driver circuit 80 which is shown in block diagrammatic form in FIG. 15 and in schematic form in FIG. 16. Considering briefly the coupling and terminating device 76 shown in FIG. 14, it preferably is comprised of a resistance network comprised of fixed electrical resistors 82, 84, 86 and 88. Resistor 82 is a terminating impedance coupled to the far end of the transmission line segment 44. The resistor is coupled to the outer conductor 90 of a coaxial cable 92 which has an inner conductor 94 coupling a communicating signal from a line driven circuit 80 to the resistor 88. The resistor 86 may or may not be required depending on relative impedance of the lines 44 and 92 and couples to resistor 88 and is shunted by resistor 84 which also has one end coupled to the outer conductor 90. The outer conductor 90 acts as a signal return path for the communications signal originating at the transmitter 60. The resistors 82, 84, 86 and 88 are frequency independent elements and merely act as impedance matching and terminating elements for optimum non reflective signal power transfer along the transmission line segments 44. Inasmuch as the power supply 78 requires a power line energization, a parallel power line 96 is coupled to all of the signal feeder circuits 74 and the signal repeater amplifiers 72. What is significant, however, is that the signal direction of propagation is toward the end of the vehicle upon which the radio antenna is mounted.

Before discussing the preferred embodiment of the line driver circuit 80, reference is first made to the embodiment of the subject invention disclosed in FIG. 8. FIG. 8 describes a configuration for transmitting communication signals along two traffic lanes 98 and 100 of a roadway 102 including separate longitudinally disposed signal transmission lines 44 and 45 respectively in the middle of the traffic lane. The traffic lanes 98 and 100 are adapted to carry traffic in the same direction and therefore the direction of signal propagation in the signal transmission lines 44 and 45 are in the same direction. This is illustrated by the vehicles 20 and 21 respectively traveling in the traffic lanes 100 and 98 in opposition to the direction of signal propagation. Both of the signal transmission lines 44 and 45 are fed from a common signal feeder circuit 74 in a manner similar to that described with the embodiment shown in FIG. 7. However, the significant difference in the embodiment shown in FIG. 8 is that although the communication signal is propagated in the same direction along the transmission lines 44 and 45 they are fed from the signal feeder circuit 74 so as to carry signals which are mutually 180° out of phase with one another which is described as anti-phase or anti-polarity feeding which operates to cancel as well as possible the 100 Ft. distance magnetic field and radiated power which although reduced still nevertheless exists to the extent of the magnitude of the current flowing through the respective transmission lines.

Both phases of the communication signals are adapted to be provided by the line driver circuitry 80 included in the signal feeder circuitry 74. Referring now briefly to FIG. 15, the line driver circuitry shown in block diagrammatic form includes a differential amplifier 104 having two differential inputs and one common mode input. One of the differential inputs is the communication signal output from the transmitter 60 and is either coupled directly thereto or appears on the signal line 68. The other differential input to the amplifier 104 comprises a negative feedback signal which is derived from one output of the differential amplifier which passes through a first signal driver amplifier 112. The output of driver amplifier 112 is directly connected to one output terminal 114 which output is defined to be the 180° phase shift signal. A portion of the output of amplifier 112 is coupled back to the other differential input of the differential amplifier 104 through circuit means 110 controlling the gain of amplifiers 104 and 112. It is well known to those skilled in the art that a differential amplifier can be adapted to provide two output signals substantially 180° out of phase with respect to one another and of equal amplitude with respect to one another. Accordingly, the other output of the differential amplifier 104 is fed to a second driver amplifier 106 whose output is directly connected to a second output terminal 108 which output is defined as the 0° out of phase output signal. Due to the fact that signal amplifiers often introduce small phase shift and amplitude differences due to circuit design and loading, the output signals appearing at terminals 108 and 114 may not necessarily be exactly 180° out of phase with respect to one another nor in the desired amplitude relationship. Therefore a second control signal referred to as the common mode error signal is derived for application to the differential amplifier 104 by means of a potentiometer 116 coupled across the respective outputs of terminals 108 and 114. The movable contact of the potentiometer 116 is coupled back to the common mode input of the differential amplifier by means of circuit lead 118. The voltage appearing on circuit lead 118 is adapted to add or subtract from the other two inputs to the differential amplifier 104 to effect an exact 180° phase shift between the signals appearing on output terminals 108 and 114 and to control the relative amplitudes of the 0° and 180° output signals. In order to obtain multiple outputs of either 0° or 180° phase shift, means such as a rheostat can be coupled to the output of either driver amplifier 106 or 112. If a phase relationship at terminals 108 and 114 other than 180° is desired, fixed or adjustable phase shift or delay elements well known in the art may be used in combination with potentiometer 116 in the feedback loop established by circuit lead 118 to effect these changes. In the embodiment shown in FIG. 15 a third output is provided at output terminal 120 by means of a rheostat 122 coupled to the output of driver amplifier 106. The output appearing at terminal 120 will be at 0° phase shift exactly like the signal appearing at terminal 108 but can be reduced in amplitude due to the resistance of the rheostat 122 placed in the circuit.

While FIG. 15 discloses a block diagram of the line driver circuit 80, FIG. 16 is a schematic diagram thereof illustrating in greater detail the circuit components utilized. The differential amplifier 104 is comprised of three transistors 124, 126 and 128. The signal line input to the differential amplifier 104 is applied to the base of transistor 124 through a capacitor 130. The other input to the differential amplifier 104 is applied to the base of transistor 126 by means of circuit means 110 which comprises a feedback circuit from the output of the operational amplifier 112. The feedback circuit includes a potentiometer 136 with a capacitor 138 having one end coupled to the slider thereof and the other end connected to the base of transistor 126, and two fixed resistors 140 and 134 connected from the base to ground and the output of the amplifier 112 respectively. The setting of the potentiometer provides a means for varying the amplitude of the feedback signal to the second input of the differential amplifier 104 and thus varying the gain of the amplifiers 104 and 112 in combination. The two outputs from the differential amplifier are developed across the collector load resistors 142 and 144 and appear on circuit leads 146 and 148, respectively, and are applied as separate inputs to the amplifiers 106 and 112 which are identical in configuration and comprise integrated circuit unity gain power amplifier units manufactured by Motorola and identified by catalog number MC1438. The output of amplifier 106 which as noted above constitute a driver amplifier is capacitively coupled to the output terminals 108 and 120 by means of the capacitor 150. Likewise the output of the amplifier 112 is capacitively coupled to the output terminal 114 by means of the capacitor 152. The combination of the amplifiers 104, 106 and 112 with their associated stray circuit reactances can produce a slight phase shift above or below 180° phase difference between the output terminals 108 and 114 and lack of symmetry in all circuit elements can produce amplitude differences in the outputs. The setting of the potentiometer 116 which is coupled across the output terminals 108 and 114 by means of the fixed resistors 154 and 156 provides a common mode voltage on circuit lead 118 which is coupled to the base of transistor 128 by means of the capacitor 158. This signal coupled to the base of transistor 128 alters its conductivity which in turn varies the common emitter potential of the differential amplifier transistors 124 and 126 to introduce a common signal opposing the unwanted phase shifts and amplitude disparities thus holding the phase and amplitude relationship of terminals 108 and 114 to predetermined values.

Having thus described the circuitry by which two communication signals are generated from a single input which are exactly 180° out of phase with respect to one another and of a selected relative amplitude to one another, it can be seen, therefore, that when terminals 108 and 114 respectively are coupled to the transmission lines 44 and 45 respectively as shown in FIG. 8, antiphase signal propagation will be directed towards the vehicles 20 and 21 traveling in the opposite direction, assuming that the respective radio antennas are mounted on the forward portion of the vehicles.

Figure 13:
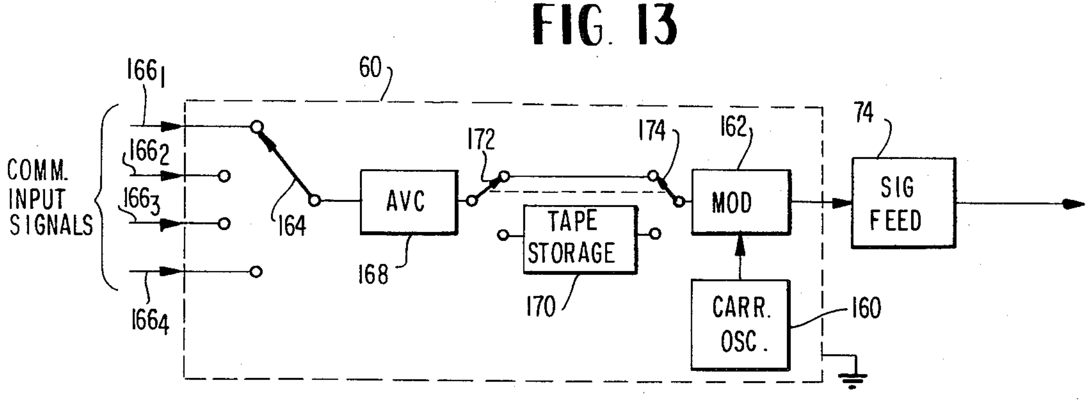
FIG. 13 is an electrical block diagram illustrative of transmitter means utilized in combination with the subject invention.

A typical transmitter 60 is further disclosed in FIG. 13 and comprises a carrier oscillator circuit 160 which couples into an AM modulator 162. A communications input signals is adapted to be coupled into the AM modulator 162 whereupon an AM carrier is applied to the signal feed circuit 74. In the present invention, it is contemplated that a plurality of input signals such as voice communications, music, etc. be selectively coupled to the modulator 162 by means of a multiposition switch 164 which is coupled to a plurality of input signal lines 166–1 . . . 166–4. The selected input signal line 166–1 is coupled to the modulator 162 through an AVC (automatic volume control circuit) 168. Also the input signal is adapted to be stored for example in a tape storage 170 which can be selectively coupled to the output of the AVC and the input of the modulator 162 by means of a pair of ganged switches 172 and 174. When the switches 172 and 174 are in position shown, the output of the AVC circuit 168 is directly coupled to the input of the modulator 162. It should also be noted that suitable power supply circuitry, not shown, is included in the transmitter circuitry 60 for applying suitable supply potentials thereto for operating the various circuit elements.

In view of the foregoing yet another embodiment of the subject invention is contemplated where it is desirable to establish a communications link along a single traffic lane of a roadway and which is a hybrid embodiment utilizing the teachings of the embodiments shown in FIGS. 7 and 8. To this end attention is directed to FIG. 10 wherein one communications transmission line 44 is located in the middle of a traffic lane 176 of a dual lane roadway 178 wherein the traffic in the other lane 180 moves in an opposite direction with respect to the traffic moving in lane 176. It was pointed out with respect to the configuration shown in FIG. 8 that the use of a pair of transmission lines propagating in the same direction but having a relative phase shift of 180° with respect to one another enhances the 100 Ft. distance magnetic and radiated field cancellation effect making it relatively easy to meet the regulations imposed by Part 15*e* of the FCC regulations. Thus an improvement in the embodiment shown in FIG. 7 can be obtained by the addition of a second transmission line 45 which is extended along the side or shoulder of the roadway in parallel relationship to the transmission line 44 in the middle of the traffic lane 176. The transmission lines 44 and 45 are fed from a signal feeder circuit 74 which includes a line driver such as disclosed in FIGS. 15 and 16 and explained above. Transmission line 44 in the middle of the roadway 176 is thus adapted to transmit a communication signal at a 0° phase shift while the transmission line 45 which is preferably in the shoulder of the roadway 176 transmits the same signal but at a phase shift of 180°. The signal direction of propagation of both transmission lines 44 and 45 is the same and is directed to the portion of the vehicle 20 upon which the radio antenna 22 is mounted when the vehicle is moving in a forward direction. Thus in the case where the radio antenna 22 is mounted on the forward part of the vehicle, the signal is propagated in an opposite direction to the vehicle travel, thereby gaining received signal enhancement for reasons explained above as well as further reducing the far field of magnetic radiation outwardly from the roadway 178. Since traffic moves in traffic lane 180 in the same direction as the signal propagated in transmission line 44 and inasmuch as there is substantially no electrostatic coupling between the vehicle 23 traveling along traffic lane 180 a highly attenuated radio signal will be received by an auto radio carried therein so that the only acceptable signal is received by the vehicle 20 allowing a different message to be supplied on the same carrier frequency by a similar but reversed installation on that side of the roadway.

Figures 10, 11, 12:
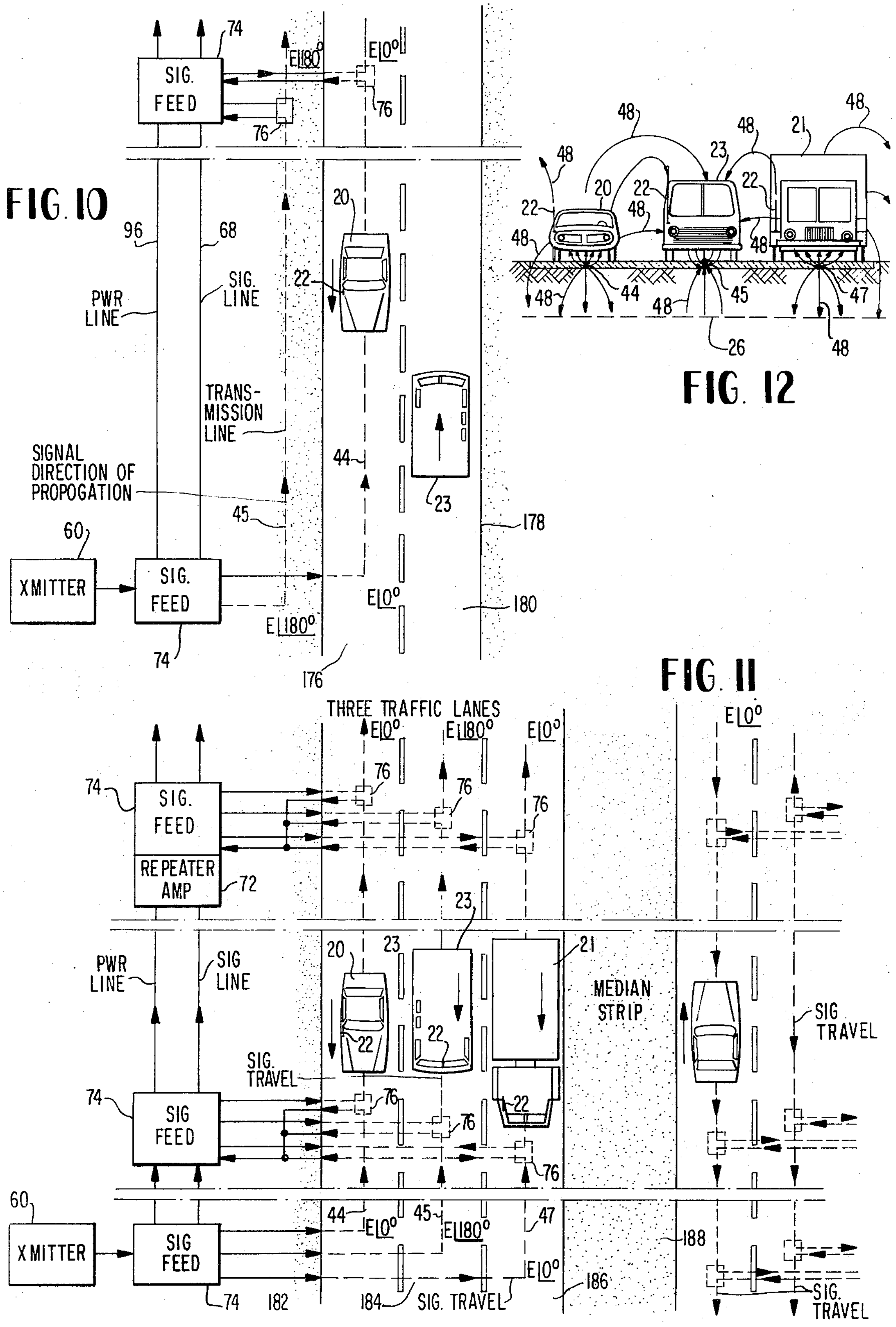
FIG. 10 is a top plan view of two traffic lanes of a roadway providing travel in mutually opposite directions and including a third embodiment of the subject invention utilized in one of the traffic lanes.
FIG. 11 is a top plan view of a plurality of traffic lanes including three unidirectional traffic lanes incorporating a third embodiment of the subject invention.
FIG. 12 is a front plan view partially in section illustrative of the electric field distribution for the embodiment of the subject invention shown in FIG. 11.

In the case where for example it is desirable to establish a communication link in each traffic lane of a multiple lane superhighway which may for example have three traffic lanes for each direction of vehicle travel, the embodiment shown in FIGS. 11 and 12 is employed. It is similar to the embodiment shown with respect to FIGS. 8 and 9 in that it includes parallel transmission lines 44 and 45 located along the middle of adjacent traffic lanes 182 and 184 but now includes a third parallel transmission line 47 located in the third traffic lane 186 and wherein each of the traffic lanes 182, 184 and 186 is adapted to accommodate the vehicles 20, 23 and 21 all traveling in the same direction. Since it is assumed that auto radio antennas 22 are mounted on the forward portion of each of the vehicles as is the standard mounting arrangement, the present invention propagates communication signals toward the vehicles as they pass over the respective transmission lines 44, 45 and 47. In the arrangement shown, the transmission line 44 establishes an enhanced communication link with the radio receiver carried in the vehicle 20 by reason of the principles outlined above. Similarly, the transmission lines 45 and 47 establish respective communication links with radio receiver apparatus carried by the vehicles 23 and 21, respectively, all having been fed signals from the transmitter 60 by way of the signal feeder apparatus 74. What is significant about the configuration of the embodiment shown in FIG. 11 is that adjacent transmission lines are operated in antiphase relationship, that is, the signal propagated along transmission line 44 is mutually 180° out of phase with the signal propagated along transmission line 45 and the signal propagated along transmission line 47 is 180° out of phase with the signal propagated along transmission line 45. This operating condition is easily acquired utilizing a line driver circuit 80 such as shown in FIGS. 15 where for example output terminals 108 and 120 would be coupled to the transmission lines 44 and 47 while output terminal 114 would be coupled to transmission line 45.

The embodiment of the system disclosed in FIG. 11 also contemplates establishing communications links with multiple traffic lanes on the other side of the median strip 188 for vehicles traveling in an opposite direction with respect to the vehicles 20, 21 and 23. In this instance the same configuration such as shown with respect to the lanes 182, 184 and 186 would be resorted to. However, it must be observed that the direction of signal propagation is reversed inasmuch as the direction of vehicle travel is reversed.

What has been shown and described, therefore, is a system for establishing a communications link between a radio transmitter operating under restricted power transmission requirements to an automotive vehicle by means of a longitudinally disposed relatively high impedance conductor located beneath the vehicle as it travels along the roadway wherein a signal voltage is capacitively coupled or electrically induced from the longitudinal conductor to the vehicle frame which is also common to one input terminal of a radio receiver mounted on the vehicle as well as inducing a voltage on a substantially vertical whip antenna coupled to the opposite input terminal of the radio receiver due to the current flowing in the longitudinal conductor such that it opposes the induced signal voltage on the vehicle frame and thus aids the signal across the receiver terminals which effect is due to the specific location of the whip antenna on the vehicle with respect to the direction of signal propagation along the longitudinal conductor and the shielding effect of the vehicle over the longitudinal conductor.

This system can also be used when the transmitter and receiver exchange places with the same advantages obtaining as is well known according to the principle of reversibility as applied to electromagnetic phenomena.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

I claim as my invention:

1. A radio communications system for enhancing a radio frequency signal communications link between first radio signal apparatus located in a vehicle and second radio signal apparatus remotely located therefrom wherein the vehicle is moving along a path of travel in a predetermined direction and where there is a requirement for highly restricted signal reception or power transmission in proximity to said path of travel, comprising in combination:

a vehicle having a portion thereof comprised of electrically conductive material;

first radio signal apparatus located on said vehicle and having a pair of signal terminals including means for coupling one of said pair of signal terminals to said electrically conductive material;

a vertically polarized radio frequency antenna responsive primarily to electric fields having vertical polarization mounted in a generally vertical orientation on said vehicle and being located at a predetermined location on said vehicle, said antenna comprising a unitary conductor element having one end coupled to the other signal terminal of said first radio signal apparatus and whose other end is unterminated;

a generally longitudinal radio frequency transmission line adapted to radiate primarily horizontally polarized signals located a predetermined length along said path of travel and being positioned in relative proximity to the electrically conductive material of said vehicle to establish capacitive, that is electrostatic, coupling therebetween with a communications signal propagated along the transmission line from one of said radio signal apparatus, said transmission line having a relatively high characteristic impedance producing a current conducting characteristic which increases the electric induction field to a relatively high level while reducing the magnetic induction field to a relatively low level,providing a dominant electric induction field thereby and enhancing the electrostatically coupled communications signal voltage between said transmission line and said vehicle portion rather than the antenna for a given current flow in said transmission line; and means coupling said second radio signal apparatus to one end of said transmission line, said end facing said predetermined location of said antenna on said vehicle.

2. The invention as defined by claim 1 wherein said first and second radio apparatus comprises receiver apparatus and transmitter apparatus respectively.

3. The invention as defined by claim 1 wherein said vehicle comprises an automotive vehicle and the radio receiver antenna is mounted on the forward portion of said automotive vehicle and said opposite end of said transmission line is relatively closer to said forward portion of said vehicle whereby a communication signal is propagated in a direction opposite to the direction of movement of said vehicle when said vehicle is moving in a forward direction.

4. The invention as defined by claim 3 wherein said transmission line is located substantially beneath said vehicle portion when said vehicle is moving along said path of travel.

5. The invention as defined by claim 3 wherein said automotive vehicle includes front and rear wheels and wherein said transmission line is located under or between said front and rear wheels.

6. The invention as defined by claim 1 wherein said transmission line is comprised of a plurality of transmission line segments and wherein said means coupling said transmitter to said transmission line comprises a respective plurality of means coupling a common radio frequency communication signal from said transmitter to the same respective end of each of said transmission line segments, and wherein said termination means comprises a respective plurality of terminations coupled to the other end of each of said transmission line segments.

7. The invention as defined by claim 1 and additionally including a second longitudinal radio signal transmission line having relatively high impedance distributed in a substantially parallel path relative to said first recited transmission line and separated therefrom by a predetermined distance and being coupled to said transmitter by said recited coupling means to the same respective opposite end as said first recited transmission line and receiving an antiphase radio signal from said transmitter; and additionally including a termination at the other end thereof wherein the same radio signal is propagated in the same direction in both transmission lines.

8. The invention as defined by claim 7 and wherein said roadway is comprised of at least one traffic lane and said first recited transmission line is located in said at least one traffic lane and the second transmission line is located exteriorally of said roadway.

9. The invention as defined by claim 8 and wherein said roadway includes an adjacent pair of traffic lanes for one way traffic and wherein said first recited transmission line is distributed along said first traffic lane and the second transmission line is distributed along said second traffic lane.

10. The invention as defined by claim 9 wherein said first and second signal transmission lines are located beneath the surface of the roadway of the respective travel lanes.

11. The invention as defined by claim 7 wherein said coupling means includes line driver circuit means comprising:

a differential amplifier having first and second input means and first and second output means and wherein said first and second output means are adapted to provide antiphase radio output signals which are substantially 180° out of phase with respect to one another;

means coupling said first input means of said differential amplifier to said radio transmitter and receiving an input radio signal therefrom;

first and second amplifier means respectively coupled to said first and said second output means of said differential amplifier;

a first output terminal coupled to the output of said first amplifier means;

a second output terminal coupled to the output of said second amplifier means;

feedback means coupled from the output of said first amplifier means to said second input means of said differential amplifier for providing a combined control of the gain of said differential amplifier and said first amplifier means; and impedance means coupled across said first and second output terminals and additionally including means coupled back to said differential amplifier for providing a phase and amplitude control signal thereto for controlling the phase difference and amplitude relationship between said output signals appearing at said first and second output, means respectively to effect a 180° phase shift between said radio output signals appearing at said first and second output terminals and to effect a constant amplitude relationship between said radio output signals.

12. The invention as defined by claim 11 and including first impedance matching resistor means coupled between said first output terminal and said first recited transmission line and second resistance impedance match means coupled between said second output terminal and said second transmission line means.

13. The invention as defined by claim 7 wherein said transmission line termination means includes a respective resistive impedance coupled from the said one end of the respective transmission line to a ground plane and additionally including means for coupling said transmitter to said ground plane.

14. The invention as defined by claim 1 wherein said roadway includes at least three traffic lanes all conducting traffic in the same direction and additionally including a second and a third or more radio signal transmission line of substantially equal length with said first recited transmission line and wherein the three or more transmission lines are respectively located in each of the adjacent lanes of said at least three traffic lanes and in substantially mutual parallel relationship, and wherein said means coupling said transmitter includes means for coupling a first, second and third or more radio signal to said first recited transmission line and said second and third or more transmission lines respectively and wherein said coupling means includes means for feeding adjacent transmission lines with radio signals in antiphase signal relationship.

15. The invention as defined by claim 14 wherein said transmission lines are positioned beneath the surface and substantially in the middle of the respective traffic lane.

16. A system for establishing a radio frequency communication link between a radio receiver mounted on a vehicle including an at least one electrically conductive vehicle portion and a radio transmitter whereupon said vehicle moves along a roadway and where there is a requirement for highly restricted radio signal power transmission in proximity to said roadway, comprising in combination:

radio receiver means located on said vehicle and having a pair of input signal terminals including means for coupling one of said pair of input signal terminals to said vehicle portion;

a vertically polarized radio frequency antenna responsive primarily to electric fields having vertical polarization mounted in a generally vertical orientation on said vehicle at a predetermined location substantially toward one end of said vehicle and including means coupling one end of said antenna to the other input signal terminal and having the other end of said antenna unterminated;

a substantially longitudinal radio frequency transmission line adapted to radiate primarily horizontally polarized signals and having a relatively high characteristic impedance for inhibiting the magnetic induction field while enhancing the electric induction field in order to utilize the "near field" of electromagnetic radiation distributed a predetermined distance along said roadway and being selectively located therealong in proximity to said vehicle to be normally shielded from the antenna as long as said vehicle is traveling substantially in the middle of the roadway whereby said antenna is shielded from said transmission line in the vicinity of said vehicle by said at least one electrically conductive vehicle portion and whereby said transmission line has enhanced electrostatic coupling to said at least one electrically conductive vehicle portion when a radio signal is propagated along said transmission line;

transmission line termination means coupled to one end of said radio frequency transmission line; and means coupling said transmitter to the opposite end of said transmission line, said opposite end being relatively nearer to said one end of the vehicle having said antenna mounted thereon, said transmitter thereby coupling a radio signal to said transmission line which is propagated therealong toward said vehicle and wherein said transmission line electrostatically couples a primary radio signal voltage to said at least one electrically conductive vehicle portion rather than the antenna which is applied to said one input signal terminal of said radio receiver and whereupon an electric field possessing vertical potential gradient components appears in the vicinity of said antenna due to the shielding effect of said vehicle portion and the location of said antenna on said vehicle relative to the direction of propagation of said radio signal along said transmission line which produces a secondary radio signal voltage at the other receiver input signal terminal coupled to said antenna which aids the electrostatically coupled primary signal applied to said one input signal terminal for providing an increased communication signal level across said pair of receiver input signal terminals.

17. The invention as defined by claim 16 wherein said vehicle comprises an automotive vehicle moving along said roadway and said transmitter and receiver comprise AM transmitter and receiver apparatus respectively.

18. The invention as defined by claim 17 wherein said radio frequency transmission line is located along said roadway so as to be positioned substantially beneath said vehicle.

19. The invention as defined by claim 17 wherein said radio frequency transmission line is located a substantially uniform predetermined depth substantially throughout the length thereof beneath the surface of the roadway.

20. The invention as defined by claim 19 wherein said roadway includes at least one traffic lane and wherein said transmission line is distributed substantially down the middle of said at least one traffic lane.

* * * * *